United States Patent [19]
Roschger et al.

[11] Patent Number: 5,948,600
[45] Date of Patent: Sep. 7, 1999

[54] METHOD AND MATERIAL FOR THE FORMATION OF A HEAT MODE IMAGE

[75] Inventors: Peter Roschger, Ludwigshafen; Stephan Michaelis, Odenthal; Karin Hassenrück, Düsseldorf; Horst Berneth, Leverkusen, all of Germany; Paul Callant, Edegem, Belgium; Herman Uytterhoeven, Bonheiden, Belgium; Luc Bastiaens, Brasschaat, Belgium; Guy Van Ackere, Beveren, Belgium

[73] Assignee: AGFA-Gevaert N.V., Mortsel, Belgium

[21] Appl. No.: 08/926,543

[22] Filed: Sep. 10, 1997

Related U.S. Application Data

[62] Continuation-in-part of application No. 08/612,870, filed as application No. PCT/EP94/02976, Sep. 6, 1994, and a continuation-in-part of application No. 08/615,213, filed as application No. PCT/EP94/02975, Sep. 6, 1994, abandoned.

[30] Foreign Application Priority Data

Sep. 13, 1993 [DE] Germany ............... 43 31 162

[51] Int. Cl.⁶ ..................................... G03C 5/16
[52] U.S. Cl. .................. 430/348; 430/200; 430/517; 430/522; 430/617; 430/944; 430/945
[58] Field of Search ............... 430/619, 3, 522, 430/945, 350, 200, 512, 348, 517, 617, 944

[56] References Cited

U.S. PATENT DOCUMENTS

| | | |
|---|---|---|
| Re. 30,107 | 10/1979 | Laridon et al. . |
| 3,060,023 | 10/1962 | Burg et al. . |
| 3,060,024 | 10/1962 | Burg et al. . |
| 3,074,809 | 1/1963 | Owen . |
| 3,085,488 | 4/1963 | Heiart . |
| 3,245,796 | 4/1966 | Burg . |
| 3,446,648 | 5/1969 | Workman . |
| 3,457,075 | 7/1969 | Morgan . |
| 3,635,719 | 1/1972 | Ohkubo et al. . |
| 3,649,268 | 3/1972 | Chu et al. . |
| 3,722,406 | 3/1973 | Strong . |
| 3,839,049 | 10/1974 | Simons . |
| 3,844,797 | 10/1974 | Willems et al. . |
| 3,951,660 | 4/1976 | Hagemann et al. . |
| 4,123,309 | 10/1978 | Perrington et al. . |
| 4,123,578 | 10/1978 | Perrington et al. . |
| 4,157,412 | 6/1979 | Deneau . |
| 4,260,677 | 4/1981 | Winslow et al. . |
| 4,547,456 | 10/1985 | Kojima et al. . |
| 4,587,198 | 5/1986 | Fisch . |
| 4,824,759 | 4/1989 | Sato et al. . |
| 4,904,572 | 2/1990 | Dombrowski et al. . |
| 4,910,185 | 3/1990 | Satake et al. . |
| 5,041,369 | 8/1991 | Fukui et al. . |
| 5,559,075 | 9/1996 | Leenders et al. ............... 503/201 |

FOREIGN PATENT DOCUMENTS

| | | |
|---|---|---|
| 599369A1 | 6/1994 | European Pat. Off. . |
| 61-182039 | 8/1986 | Japan . |
| 1111492 | 8/1965 | United Kingdom . |
| 1173426 | 4/1967 | United Kingdom . |
| 1439478 | 12/1973 | United Kingdom . |
| WO8804237 | 6/1988 | WIPO . |
| WO9303928 | 3/1993 | WIPO . |

*Primary Examiner*—Thorl Chea
*Attorney, Agent, or Firm*—Baker & Botts, L.L.P.

[57] ABSTRACT

The present invention relates to an infra-red laser sensitive thermographic material and to a process for forming a heat mode image using such a material.

24 Claims, No Drawings

METHOD AND MATERIAL FOR THE FORMATION OF A HEAT MODE IMAGE

SPECIFICATION

This application is a continuation-in-part of U.S. application Ser. No. 08/612,870, filed Mar. 13, 1996, pending, which is a national stage application of PCT/EPC94/02976, filed Sep. 6, 1994, and Ser. No. 08/615,213, filed Mar. 13, 1996, now abandoned, which is a national stage application of PCT/EPC94/02975, filed Sep. 6, 1994, both claiming priority of German patent application P43 31 162.8, filed Sep. 14, 1993.

FIELD OF THE INVENTION

The present invention relates to an infra-red laser sensitive thermographic material and to a process for forming a heat mode image using such a material.

BACKGROUND OF THE INVENTION

Conventional photographic materials based on silver halide are used for a large variety of applications. For instance, in the prepress sector of graphic arts rather sensitive camera materials are used for obtaining screened images. Scan films are used for producing colour separations from multicolour originals. Phototype setting materials record the information fed to phototype and image setters. Relative insensitive photographic materials serve as duplicating materials usually in a contact exposure process. Other fields include materials for medical recording, duplicating and hard copy, X-ray materials for non-destructive testing, black-and-white and colour materials for amateur- and professional still photography and materials for cinematographic recording and printing.

Silver halide materials have the advantage of high potential intrinsic sensitivity and excellent image quality. On the other hand they show the drawback of requiring several wet processing steps employing chemical ingredients which are suspect from an ecological point of view. E.g. the commonly used developing agent hydroquinone is a rather unwanted ingredient because of its allergenic effects. The biodegradation of disposed Phenidone is too slow. Sulphite ions show a high COD (Chemical Oxygen Demand) and the resulting sulphate ions are harmful for e.g. concrete. As a consequence it is undesirable that depleted solutions of this kind would be discharged into the public sewerage; they have to be collected and destroyed by combustion, a cumbersome and expensive process.

In the past several proposals have been made for obtaining an imaging element that can be developed using only dry development steps without the need of processing liquids as it is the case with silver halide photographic materials.

A dry imaging system known since quite a while is 3M's dry silver technology. It is a catalytic process which couples the light-capturing capability of silver halide to the image-forming capability of organic silver salts. Traditionally, silver halide, preferably silver bromide, is formed in situ by reacting silver behenate with bromide ions. The result of this process is the formation of very fine grains of silver bromide, less than 500 angstroms in diameter and positioned in catalytic proximity to the silver behenate. Exposure to light causes photolytic reduction at the silver bromide crystal (latent image formation) and provides a silver nucleus in position to permit electron transfer that catalyzes the reduction of the organic silver salt to silver metal at an elevated temperature thus producing a visual density. A disadvantage of this technology is that in the non-exposed areas silver halide remains which forms print-out silver on aging thereby increasing the minimal density eventually to an unacceptable level for some purposes. Details on the dry silver technology can be found in U.S. Pat. Nos. 3,457,075, 3,839,049, 4,260,677 and *J. Phot. Sci.,* Vol. 41 (1993), p. 108.

Another type of non-conventional materials as alternative for silver halide is constituted by so-called photo mode materials based on photopolymerisation. The use of photopolymerizable compositions for the production of images by information-wise exposure thereof to actinic radiation is known since quite a while. All these methods are based on the principle of introducing a differentiation in properties between the exposed and non-exposed parts of the photopolymerizable composition e.g. a difference in solubility, adhesion, conductivity, refractive index, tackiness, permeability, diffusibility of incorporated substances e.g. dyes etc.. The thus produced differences may be subsequently employed in a dry treatment step to produce a visible image and/or master for printing e.g. a lithographic or electrostatic printing master.

A difference in solubility between the exposed and non-exposed parts of the photopolymerizable composition is often used for the production of lithographic printing plates where a hydrophilic base is coated with the photopolymerizable composition, subsequently exposed and developed using a solvent to remove the non-exposed or insufficiently exposed parts. Such a process is for example described in "Unconventional imaging processes" by E. Brinckman, G. Delzenne, A. Poot and J. Willems, Focal Press London-New York, first edition 1978, pages 33 to 39.

The use of the difference in tackiness to obtain an image is described in e.g. U.S. Pat. Nos. 3,060,024, 3,085,488 and 3,649,268. According to the method disclosed in these US patent applications the image-wise exposed photopolymerizable composition loses its tackiness in the exposed parts while the non-exposed parts keep their tackiness. The non-exposed parts can therefore be colored with dry dye pigments to make the image visible.

According to the methods described in e.g. U.S. Pat. Nos. 3,245,796 and EP-A 362,827 the diffusibility of a dye is impeded in the photo exposed parts of the photopolymerizable composition so that during an overall thermal heating subsequent to photo-exposure dye substances in the non-exposed areas will be able to diffuse to a receptor material. According to a similar method described in U.S. Pat. No. 4,587,198 the photopolymerizable composition is made impermeable in the exposed parts for a sublimable dye or dyepigment present in a layer adjacent to the layer comprising the photopolymerizable composition.

According to a method disclosed in U.S. Pat. No. 3,060,023 the adhesion of the photopolymerizable composition is modified upon image-wise exposure. After image-wise exposure the non-exposed parts will stick or adhere, during a step of overall heating, to a receiving sheet thus allowing the transfer of the non-exposed parts to the receiving sheet.

As illustrated above photopolymerization can be used in a variety of methods to reproduce images. Among these methods several are using dry-developing steps for producing the image which is convenient and offers an ecological advantage. However the sensitivity of most photopolymerizable compositions is rather low so that they are e.g. not suitable for use in exposure with laser light sources which are recently widely employed for producing images.

As a further alternative for silver halide chemistry dry imaging elements are known that can be image-wise exposed using an image-wise distribution of heat. These types of dry imaging elements also called heat recording materials or heat mode materials offer the advantage in addition to an ecological advantage that they do not need to be handled in a dark room nor any other protection from ambient light is needed. Heat mode recording materials are disclosed in e.g. U.S. Pat. No. 4,123,309, U.S. Pat. No. 4,123,578, U.S. Pat. No. 4,157,412, U.S. Pat. No. 4,547,456 and PCT applications WO 88/04237 and WO 93/03928.

Most known photo mode and heat mode materials are based on a peel-off treatment which produces separated elements part of which is solid waste.

The present invention further extends the teachings on heat mode materials, the main improvement being the formation in a mono-sheet type element of an image ready for inspection or further use without the need for a wet treatment and without the formation of solid waste.

It is a first object of the present invention to provide a method, and a material for use with it, for the formation of an image without giving rise to solid waste whereby the background absorption of the image in the near ultra-violet is so low that the image can be used as intermediate for the exposure of a UV-sensitive material, e.g. a printing plate.

It is a second object of the present invention to provide a method, and a material for use with it, for the formation of an image without giving rise to solid waste whereby the background absorption of the image in the visible spectral region is so low that the image can be used for direct visual inspection.

Other objects of the present invention will become clear from the description hereafter.

SUMMARY OF THE INVENTION

The first object of the present invention is realized by providing a method for the formation of a heat mode image comprising exposing information-wise by infra-red laser radiation a thermographic material comprising a support and, distributed over one or more layers, (a) a reducible organic metal salt, (b) polymeric binder, (c) a reducing agent and (d) an infra-red absorbing compound whereof the ratio of its average internal absorptance between 330 nm and 430 nm (as will be defined in the description) to its internal absorptance at the emission wavelength of the laser is at most 0.5, said laser exposure inducing the thermal reduction of said organic metal salt in the exposed areas by means of the transformation of infra-red radiation into heat.

The second object of the invention is realized by providing a method for the formation of a heat mode image comprising exposing information-wise to infra-red laser radiation a thermographic material comprising a support and, distributed over one or more layers, (a) a reducible organic metal salt, (b) polymeric binder, (c) a reducing agent, and (d) an infra-red absorbing compound whereof the respective ratios of its average internal absorptances (as will be defined in the description), between 400 and 500 nm, between 500 and 600 nm, and between 600 and 700 nm respectively, to its internal absorptance at the emission wavelength of the laser are all three at most 0.5, said laser exposure inducing the thermal reduction of said organic metal salt in the exposed areas by means of the transformation of infra-red radiation into heat.

Thanks to the low side absorptions of the infra-red absorbing compounds, in the near UV and in the visible region respectively, an image is obtained which can be used as master for the exposure of a UV sensitive element, e.g. a printing plate, and for direct visual inspection respectively.

Preferred reducible organic metal salts are organic silver salts, most preferably silver behenate.

A preferred group of infra-red absorbing dyes obeying the above criteria of low side absorption are described in the German patent application DE 43 31 162.

DETAILED DESCRIPTION OF THE INVENTION

Infra-red absorbing compounds—also called infra-red absorbing dyes (IRD)—are known since a long time and belong to several different chemical classes, e.g. indoaniline dyes, oxonol dyes, porphine derivatives, anthraquinone dyes, merostyryl dyes, pyrylium compounds and sqarylium derivatives. References to these compounds can be found in numerous patent applications and in commercial brochures.

Most of these prior art infra-red dyes show high side absorptions in the UV and/or visible spectral region. However, for a successful execution of the present invention the infra-red dyes must show low side absorptions characterized by specific spectral parameters the determination of which will be described in detail later on.

A first group of dyes—which turned out to be the most successful for the practice of this invention—belongs to the scope of the general formula of the German patent application cited above. This general formula (I) is represented by:

(I)

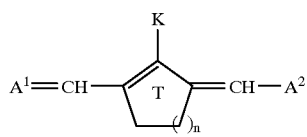

wherein K represents Q together with a counterion An—, or

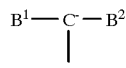

wherein Q represents chlorine, fluorine, bromine, iodine, alkyloxy, aryloxy, dialkylamino, diarylamino, alkylarylamino, nitro, cyano, alkylsulphonyl, arylsulphonyl, heterocyclyl, or a moiety represented by

wherein L represents alkyl, aryl, heterocyclyl, cyano or substituted carbonyl, thiocarbonyl or iminocarbonyl, An— represents an anion commonly used in the chemistry of cationic dyes, or an equivalent thereof, $B^1$ represents cyano, alkoxycarbonyl, alkyl- or arylcarbonyl, or aminocarbonyl optionally substituted once or twice at the nitrogen atom by alkyl and/or aryl, $B^2$ represents arylsulphonyl, alkylsulphonyl, heteroaryl, or,

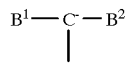

can be represented by

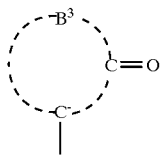

wherein $B^3$ represents the non-metal atoms to complete a carbocyclic or heterocyclic ring, ring T can be substituted by 1 to 3 $C_1$–$C_4$ alkyl groups, n=1 or 2, and $A^1$ and $A^2$ can represent following combinations:

(1) moieties of formulas (IIIa) and (IIIb)

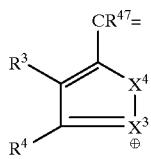 (IIIa)

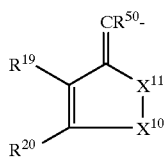 (IIIb)

wherein $x^3$, $x^{10}$=O, $X^4$, $X^{11}$=—$CR^{38}$=$CR^{39}$—, $R^{38}$ and $R^{39}$ each independently represent hydrogen, alkyl, aryl or together the necessary non-metal atoms to complete a cycloaliphatic, aromatic or heterocyclic 5- or 7-membered ring, or independently from each other, the necessary non-metal atoms to complete a cycloaliphatic, aromatic or heterocyclic 5- or 7-membered ring, and $R^3$, $R^4$, $R^{19}$ and $R^{20}$ each independently represent hydrogen, $C_1$–$C_8$ alkyl, aryl, halogen, cyano, alkoxycarbonyl, optionally substituted aminocarbonyl, amino, monoalkylamino, dialkylamino, hydroxy, alkoxy, aryloxy, alkylthio, arylthio, acyloxy, acylamino, arylamino, alkylcarbonyl, arylcarbonyl, or the necessary non-metal atoms to complete a cycloaliphatic, aromatic or heterocyclic 5- or 7-membered ring, (2) moieties of the same formulas (IIIa) and (IIIb) wherein $x^3$, $X^{10}$=$R^{44}$N, $X^4$, $X^{11}$=—$CR^{38}$=$CR^{39}$—, and wherein $R^3$ and $R^4$, respectively $R^{38}$ and $R^{39}$ together represent the atoms to complete an optionally substituted aromatic ring, and wherein $R^{44}$ represents optionally substituted alkyl or aryl, or the necessary atoms to complete a 5- or 7-membered ring, (3) moieties of the formulas (IVa) and (IVb):

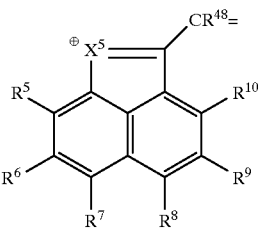 (IVa)

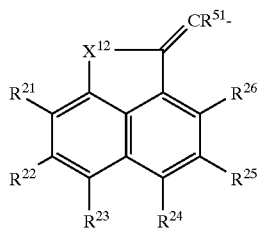 (IVb)

wherein $X^5$ and $X^{12}$ each independently represent O, S, Se, Te or $R^{44}$N, $R^5$ to $R^{10}$ and $R^{21}$ to $R^{26}$ each independently represent one of the meanings given above for $R^3$, and $R^{48}$ and $R^{51}$ each independently represent hydrogen, alkyl, aryl or alkoxycarbonyl, with the exception for those compounds in which together $X^5$, $X^{12}$=$R^{44}$N and Q=halogen, (4) moieties of formulas (VIIa) and (VIIb)

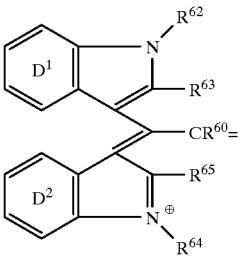 (VIIa)

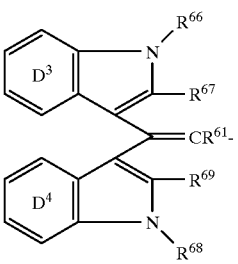 (VIIb)

wherein $R^{60}$ and $R^{61}$ each independently represent hydrogen, alkyl, aryl, cyano, alkoxycarbonyl, halogen, $R^{62}$, $R^{64}$, $R^{66}$, $R^{68}$ each independently represent alkyl or aryl, $R^{63}$, $R^{65}$, $R^{67}$, $R^{69}$ each independently represent hydrogen, alkyl or aryl, and wherein the rings $D^1$ to $D^4$ each independently can be substituted once or frequently by hydrogen, chlorine, bromine, alkyl, or alkoxy.

Most preferred subclasses of this general formula (I) are the following compounds according to formula (XXI)

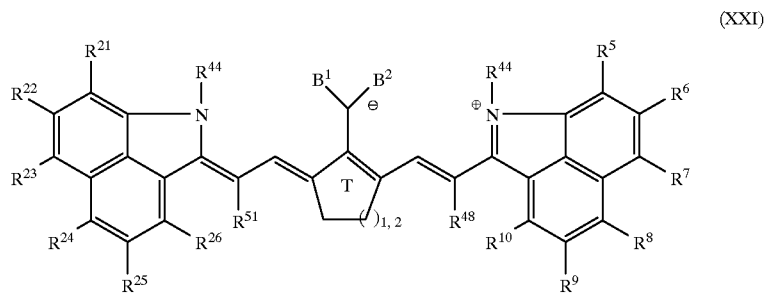

(XXI)

compounds according to formula (XXIII):

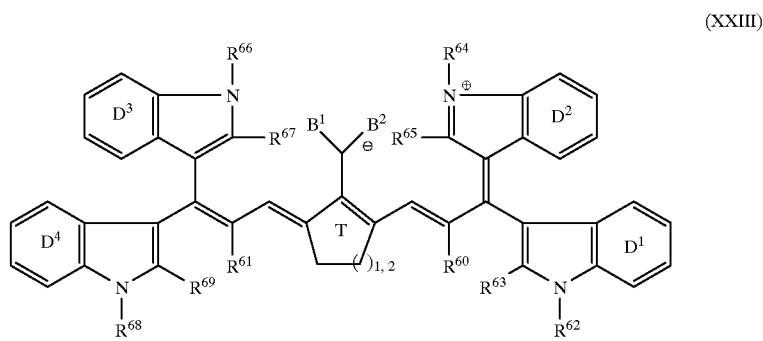

(XXIII)

compounds according to formula (XXV)

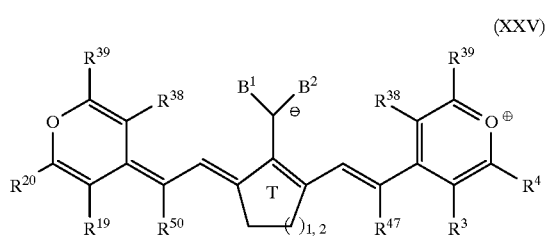

(XXV)

compounds according to formula (XXVII)

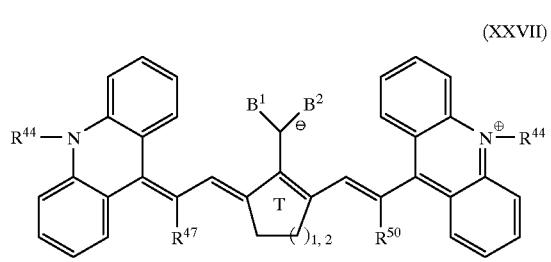

(XXVII)

compounds according to formula (XXIX)

(XXIX)

In the formulas of these subclasses, $R^1$, $R^2$, $R^{17}$ and $R^{18}$ have the same meaning as $R^3$ and $B^1$, $B^2$. The other R symbols, T, and the D symbols are defined as hereinbefore, and $\alpha$ is 0 or 1.

Further, $R^{33}$, $R^3$ may represent, independently of each other, hydrogen, alkyl aryl or alkoxycarbonyl. $R^{33}$, $R^{34}$ may together represent the non-metal atoms necessary to close a substituted or unsubstituted carbo- or heterocyclic 5- to 7-membered ring.

$R^{46}$, $R^{47}$, $R^{49}$, $R^{50}$ represent hydrogen, alkyl, aryl, cyano, alkoxy-carbonyl or the non-metal atoms necessary to form saturated or unsaturated 5- to 7-membered rings between $R^{46}$ and respectively $X^1$ and $X^2$, $R^{47}$ and respectively $X^4$ and $R^3$, $R^{49}$ and respectively $X^8$ and $X^9$ or $R^{50}$ and respectively $X^{11}$ and $R^{19}$.

$X^1$, $X^8$, $X^4$, $X^{11}$ may represent, independently of each other, $CR_{35}R_{36}$, O, S, $R_{37}$, N, Se, Te, —$CR_{38}$=$CR_{39}$—, —N=$CR_{40}$, —Z, —$CR_{41}R_{42}$— or

or only $X^4$, $X^{11}$ supplementarily to C* being linked to $X^3$ or $X^{10}$, $X^2$, $X^3$, $X^5$, $X^6$, $X^7$, $X^9$, $X^{10}$, $X^{12}$, $X^{13}$, $X^{15}$ may represent O, S, Se, Te.

In a preferred embodiment of the present invention, $R^{33}$ and $R^{34}$ together may represent a di-or trimethylene residue.

In a preferred embodiment of formula (XXV), $R^4$, $R^{20}$, $R^{39}$ may represent phenyl and $R^3$, $R^{19}$, $R^{38}$ may represent hydrogen or $C_1$–$C_4$-alkyl.

In a further preferred embodiment of formula (XXV),
$R^{47}$=$R^{50}$
$R^3$=$R^{38}$=$R^{19}$
$R^4$=$R^{20}$=$R^{39}$.

In a preferred embodiment of formula (XXVII), $R^{47}$ and $R^{50}$ are identical and represent hydrogen or $C_1$–$C_{16}$-alkyl.

In a preferred embodiment of formula (XXIX),
$R^1$=$R^{17}$
$R^2$=$R^{18}$
$R^{46}$=$R^{49}$, and if α is identical to 1, $R^{32}$ and $R^{34}$ represent a di-or trimethylene residue.

In a further preferred embodiment of formula (XXIX), $R^1$, $R^{17}$ represent hydrogen, $C_1$–$C_4$-alkyl, benzoyl or $C_1$–$C_4$-alkoxycarbonyl;
$R^2$, $R^{18}$, $R^{39}$ represent phenyl;
$R^{38}$ represents hydrogen, $C_1$–$C_4$-alkyl, phenyl or $C_1$–$C_4$-alkoxycarbonyl;
$R^{46}$, $R^{49}$ represent hydrogen, $C_1$–$C_4$-alkyl, phenyl or $R^{38}$; and
$R^{46}$, $R^{49}$ and $R^{38}$ together represent a di-or trimethylene residue.

In yet a further embodiment of a formulae (XXIX),
$R^{39}$, $R^2$, $R^{18}$ represent phenyl;
$R^1$, $R^{17}$ represent hydrogen; and
$R^{38}$ and $R^{46}$ or $R^{38}$ and $R^{49}$ together represent a di-or trimethylene residue.

A further preferred embodiment of the dye of formula (XXIX), wherein α is identical to 1, and $R^{33}$ and $R^{34}$ together form a di-or trimethylene residue.

Some specific infra-red absorbing dyes (IRD) corresponding to general formula (I) or to one of the preferred subclasses defined above which are chosen for the determination of specific spectral characteristics are listed below. A reference number is designated to them by which they will be identified in the tables further on of the description and examples:

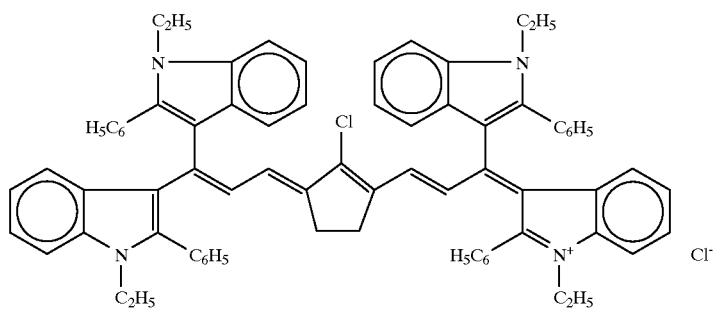

IRD No. 1

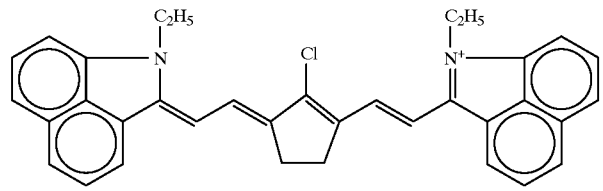

IRD No. 2

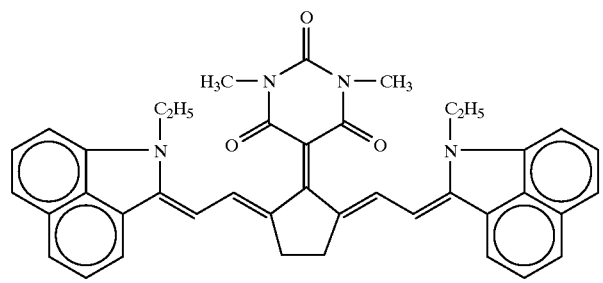

IRD No. 3

IRD No. 4
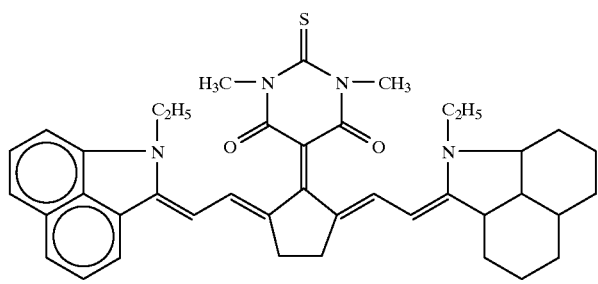
IRD No. 5
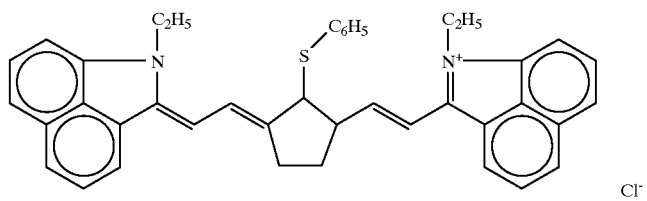
IRD No. 6
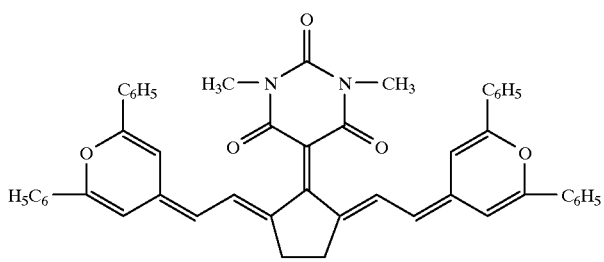
IRD No. 7
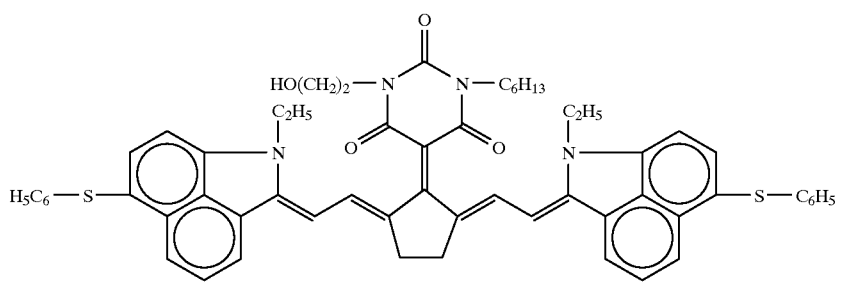
IRD No. 8
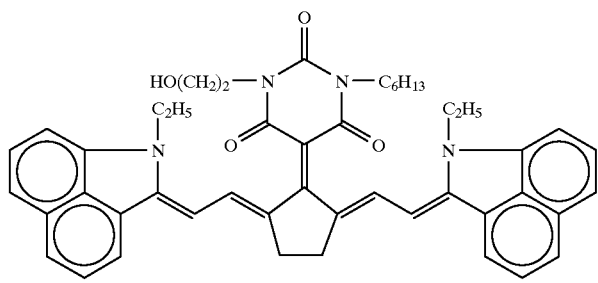
IRD No. 9
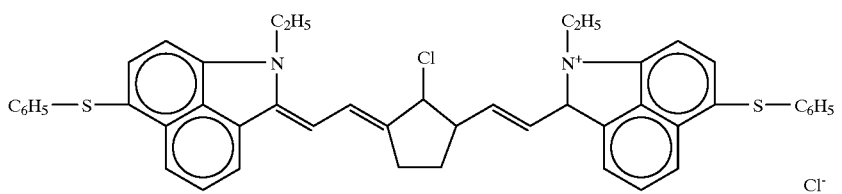

IRD No. 10

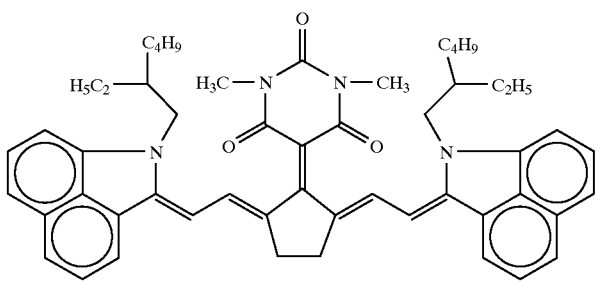

IRD No. 11

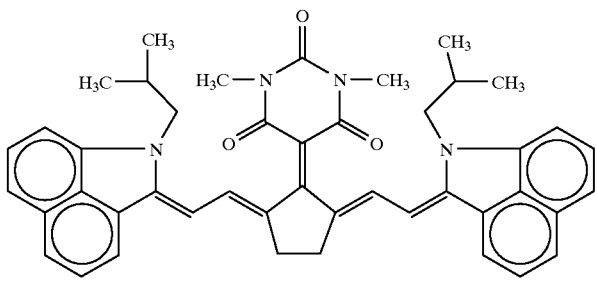

IRD No. 12

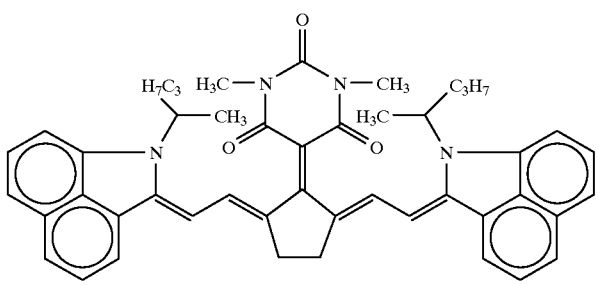

Further suitable prior art dyes included in the experimental investigation of spectral parameters are represented by following formulas:

IRD-14 is a commercial product known as CYASORB IR165, marketed by American Cyanamid Co, Glendale Protective Technologie Division, Woodbury, N.Y. It is a mixture of two parts of the molecular non-ionic form (IRD-14a) and three parts of the ionic form (IRD-14b) represented by IRD No. 14a

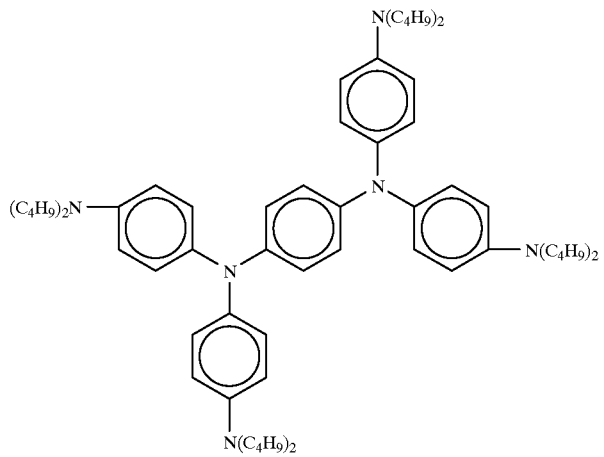

-continued

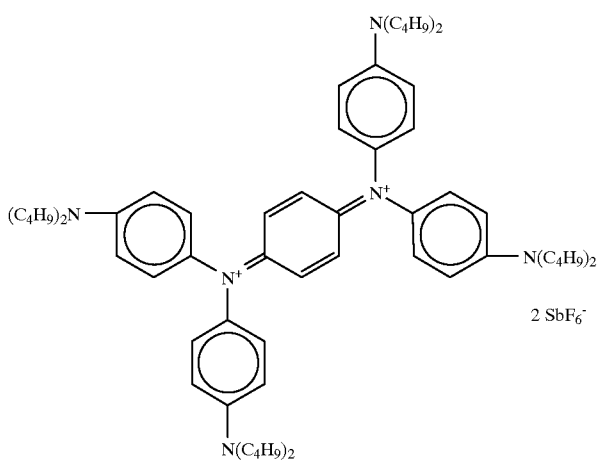

IRD No. 14b

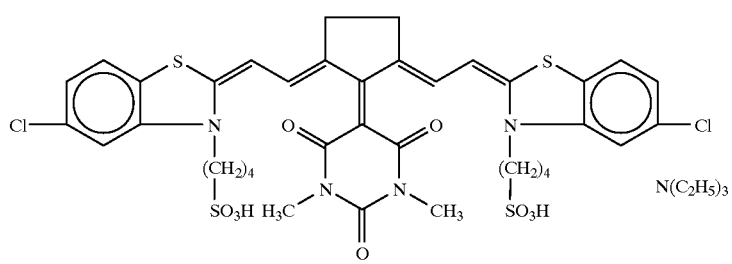

IRD No. 15

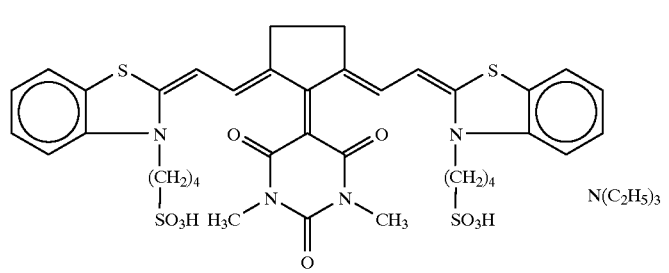

IRD No. 16

A further class of infra-red dyes included in the experimental investigation are commercially available compounds (IRD No's 17 to 24) the chemical structural formula of which is unknown and which are designated by a commercial code name. A summary of all the infra-red absorbing compounds included in the experimental investigation is given in table 1 (all tables are brought together in a text section after the examples).

The determination of the specific spectral characteristics will now be explained in detail. The terms and symbols used are explained in "Optical Radiation Measurements", Vol. I Radiometry, F. Grum and R. J. Becherer, Academic press, New York, (1979).

Each of the selected infra-red absorbing compounds was dissolved in a suitable solvent (MEK standing for methyl-ethylketone and MeOH for methanol) at a suitable concentration and the spectral internal absorbance $A(\lambda)$ was measured by means of a Perkin-Elmer type Lambda-9 spectrophotometer.

For dyes in solution which neither diffuse neither reflect the incoming radiation and which obey to Beer's law the spectral internal absorbance $A(\lambda)$ is related to the spectral internal transmittance $\tau_i(\lambda)$ by the equation:

$A(\lambda)=\log [1/\tau_i(\lambda)]$ or $\tau_i(\lambda)=10$ exp. $-A(\lambda)$ Moreover, since there is no reflection the sum of the spectral internal absorptance $\alpha_i(\lambda)$ and of the spectral internal transmittance $Ti(\lambda)$ is equal to 1 of which follows $\alpha_i(\lambda)=1-\tau_i(\lambda)$ For each of the evaluated dyes the spectral internal absorptance $\alpha_i(\lambda)$ was calculated in function of wavelength from the measured spectral internal absorbance $A(\lambda)$. From these data average internal absorptances $\overline{\alpha}_i$ were calculated over specific wavelength intervals, namely over 330–430 nm (UV), over 400–500 nm (visible), over 500–600 nm (visible) and over 600–700 nm (visible). These average internal absorptances $\overline{\alpha}_i$, and the spectral internal absorptances at some specific wavelengths corresponding to the emission wavelength of particular laser types are summarized in table 2.

Then for each dye the ratio was calculated between the average internal absorptance in the UV area (330–430 nm) and the internal absorptances at some specific infra-red wavelengths corresponding to the emission wavelength of some particular laser types, namely 1053 nm, 1064 nm, 985 nm and 823 nm respectively. This ratio was recognized as a meaningful measure for the overall side absorption in the near UV. The values of these calculated ratios are summarized in table 3. It will be clear that for the successful practice of this invention those IR dyes which show the lowest UV side absorption will be most suited for those applications were the final heat mode image is used as a master for the UV exposure of a UV sensitive element, e.g. a printing plate, a roomlight duplicating material, a proofing material, a photoresist or a photopolymerisable element. It was deduced from extensive experimental investigation (see examples further on) that the upper limit for the ratio defined above which still allows for the formation of a thermographic image suitable for further UV exposure is 0.5. In a most preferred embodiment this ratio is at most 0.3. From inspection of table 3 it becomes clear that when using a laser exposure at 1053 nm or 1064 nm the IR dyes Nos. 1, 2, 3, 4, 5, 7, 9, 10, 11, 12 and 13 all belonging to the scope of the German patent application cited above are suited. However if a laser emitting at 985 or 823 nm is used most of these dyes become unsuitable. For instance, for a wavelength of 823 nm only dyes 2, 3 and 5 can be used with satisfying results. Furtheron one can conclude from the table that prior art and commercial IR dyes Nos. 14 to 24 are all unusable for any laser emission wavelength.

A similar calculation was performed of the ratios between the average internal absorptances in the visible area, namely for the intervals 400–500 nm, 500–600 nm and 600–700 nm respectively, and the internal absorptance at the same specific laser emission wavelengths as above. For these calculations the visible spectral region was splitted in three parts because an overall low side absorption calculated over the global visible region would not exclude the existence of some particular peak side absorption which would render the dye unsuitable since an unacceptable particular colour hue would appear in the final image. All these calculated ratios constituting a meaningful measure for the side absorptions in the visible area are summarized in the tables 4, 5, 6 and 7, each table dealing with a particular laser emission wavelength. It will be clear that those IR dyes will be most suited which show the lowest ratio in the three intervals defined for those applications where visual inspection of the final image is the ultimate goal, e.g. application as hard copy in the medical diagnostic field, in the graphic arts field, in the microfilm area or in the digital proofing field. It was deduced again from extensive experimental investigation (see examples furtheron) that the upper limit for the ratio defined above which still allows for the formation of a thermographic image suitable for visual inspection was 0.5 as it was also the case for the side absorption in the UV area. In a most preferred embodiment this ratio is at most 0.3.

From inspection of table 4 it can be seen that the IR absorbing compounds Nos. 1 to 13 are suitable dyes. It will be remarked that e.g. dyes 14 and 23 specifically show a side absorption which is too high in the 400–500 nm interval resulting in a disturbing green background hue which renders them unsuitable. Inspection of the other tables and mutual comparison teaches that the best dyes for one particular laser emission wavelength are not necessarily the best for another wavelength. However it is clear that in general the dyes belonging to the scope of the German patent application cited above are the most suited.

In a most preferred embodiment of the present invention the organic metal salt present in the thermographic material is an organic silver salt. Substantially light-insensitive organic silver salts particularly suited for use according to the present invention in the heat-sensitive recording layer are silver salts of aliphatic carboxylic acids known as fatty acids, wherein the aliphatic carbon chain has preferably at least 12 C-atoms, e.g. silver laurate, silver palmitate, silver stearate, silver hydroxystearate, silver oleate and silver behenate. Silver salts of modified aliphatic carboxylic acids with thioether group as described e.g. in GB-P 1,111,492 and other organic silver salts as described in GB-P 1,439,478, e.g. silver benzoate and silver phthalazinone, may be used likewise to produce a thermally developable silver image. Further can be used silver salts of aromatic carboxylic acids (e.g. benzoic acid, phthalic acid, terephtalic acid, salicylic acid, m-nitrobenzoic-, phenylacetic-, pyromellitic-, p-phenylbenzoic-, camphoric-, huroic-, acetamidobenzoic- and o-aminobenzoic acid, etc.). Furtheron can be used silver salts of mercapto group- or thione group-containing compounds (e.g., 3-mercapto-4-phenyl-1,2,4-triazole, 2-mercaptobenzimidazole, etc.) or an imino group-containing compound (e.g. benzotriazole or derivatives thereof as described in GB 1,173,426 and U.S. Pat. No. 3,635,719, etc.). Further are mentioned silver imidazolates and the substantially light-insensitive organic silver salt complexes described in U.S. Pat No. 4,260,677.

In a most preferred embodiment of the present invention the organic silver salt is silver behenate. The compound is colorless, visibly stable toward light, insoluble in many volatile liquid vehicles, and moisture-resistant. It is produced in the desired physical form without difficulty and at reasonable cost.

Other reducible organic metal salts beside silver salts include e.g. iron(III) stearate, iron(III) rosinate, iron(III) laurate, nickel stearate, nickel rosinate, nickel acetate, nickel oleate, copper rosinate, copper acetate, cobalt stearate, cobalt acetate and zinc stearate. A particular salt is often used in combination with a particular reducing agent in the donor element (see furtheron) in order to obtain optimal results.

Suitable reducing agents for use in the thermographic element include pyrogallol, 4-azeloyl-bis-pyrogallol, 4-stearyl pyrogallol, gallolacetophenone, di-tertiary-butyl pyrogallol, gallic acid anilide, methyl gallate, ethyl gallate, normal- and iso-propyl gallate, butyl gallate, dodecyl gallate, gallic acid, ammonium gallate, ethyl protocatechuate, cetyl protocatechuate, 2,5-dihydroxybenzoic acid, 1-hydroxy-2-naphthoic acid, 2-hydroxy-3-naphthoic acid, phloroglucinol, catechol, 2,3-naphthalene diol, 4-lauroyl catechol, sodium gallate, protocatechualdehyde, 4-methyl esculetin, 3,4-dihydroxy benzoic acid, 2,3-dihydroxy benzoic acid, hydroquinone, 4,4'-dihydroxy biphenyl, 3,4-dihydroxyphenylacetic acid, 4-(3',4'-dihydroxyphenylazo)benzoic acid, 2,2'-methylene-bis-3,4,5-trihydroxybenzoic acid, ortho- and para-phenylene diamine; tetramethyl benzidine, 4,4',4"-diethylamino-triphenylmethane, o-, m-, and p-aminobenzoic acid, α- and β-naphthols, 4-methoxy, 1hydroxy-dihydronaphthalene and tetrahydroquinoline.

Other useful reducing agents include resorcins, m-aminophenols, alkylphenols, alkoxynapthols, m-phenylenediamines. A further class of reducing agents is constituted by hydrazine compounds. Especially preferred hydrazine compounds include p-tolylhydrazine hydrochloride, N,N-phenylformylhydrazide, acetohydrazide, benzoylhydrazide, p-toluenesulphonylhydrazide, N,N'-diacetylhydrazine, β-acetyl-phenylhydrazine, etc.

An especially preferred reducing agent is "Spirana", disclosed in European patent application Appl. No. 93203120, corresponding to following chemical formula:

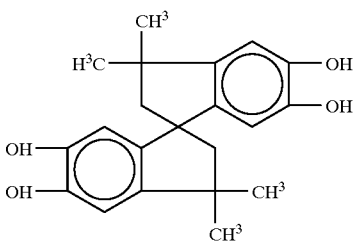

The reducing agents may be used in combination if desired.

Particular organic metal salts of the photosensitive element, especially when they are not organic silver salts, are often preferably used with particular reducing agents in order to optimize the reduction reaction. Examples of such preferred "reaction pairs" can be found e.g. in U.S. Pat. No. 3,722,406, col. 3, table 1.

In order to obtain a neutral black image tone in the higher densities and neutral grey in the lower densities the recording layer further preferably contains a so-called toning agent known from thermography or photo-thermography.

Suitable toning agents are the phthalimides and phthalazinones within the scope of the general formulae described in US-P Re. 30,107. Further reference is made to the toning agents described in U.S. Pat. Nos. 3,074,809, 3,446,648 and 3,844,797. Other particularly useful toning agents are the heterocyclic toner compounds of the benzoxazine dione or naphthoxazine dione type within the scope of following general formula:

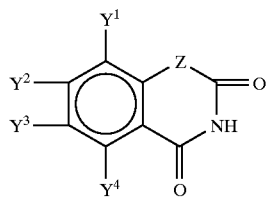

wherein Z represents O or N-alkyl, each of $Y^1$, $Y^2$, $Y^3$ and $Y^4$ (same or different) represents hydrogen, alkyl, e.g. $C_1$–$C_{20}$ alkyl, preferably $C_1$–$C_4$ alkyl, cycloalkyl, e.g. cyclopentyl or cyclohexyl, alkoxy, preferably methoxy or ethoxy, alkylthio with preferably up to 2 carbon atoms, hydroxy, dialkylamino of which the alkyl groups have preferably up to 2 carbon atoms or halogen, preferably chlorine or bromine; or $Y^1$ and $Y^2$ or $Y^2$ and $Y^3$ represent the ring members required to complete a fused aromatic ring, preferably a benzene ring, or $Y^3$ and $Y^4$ represent the ring members required to complete a fused-on aromatic or cyclohexane ring. Toners within the scope of said general formula are described in GB-P 1,439,476 and U.S. Pat. No. 3,951,660.

A toner compound particularly suited for use in combination with said polyhydroxy spiro-bis-indane reducing agents is 3,4dihydro-2,4-dioxo-1,3,2H-benzoxazine described in U.S. Pat. No. 3,951,660.

Examples of useful binders include organic solvent-soluble polymers, e.g. polymers derived from α,β-ethylenically unsaturated compounds such as e.g. polymethyl methacrylate, polyvinyl chloride, a vinylidene chloride-vinyl chloride copolymer, polyvinyl acetate, a vinyl acetate-vinyl chloride copolymer, a vinylidene chloride-acrylonitrile copolymer, a styrene-acrylonitrile copolymer, chlorinated polyethylene, chlorinated polypropylene, a polyester, a polyamide, a polycarbonate, a polyurethane, and cellulose derivatives such as celluloseacetatebutyrate, cellulosenitrate, etc. An especially preferred halogen-free binder, which is ecologically interesting, is polyvinylbutyral containing some vinyl alcohol units (sold under the trade name BUTVAR by MONSANTO Co). Several organic solvents can be used for dissolving and coating these polymers. These polymer binders may be used either alone or in combination of two or more thereof.

Alternatively water-soluble binders can be used, e.g. gelatin, polyvinyl alcohol, polyvinyl pyrrolidone, carboxymethyl cellulose, methyl cellulose, ethyl cellulose, gum arabic, casein, latex polymer dispersions, such as dispersions of polyester, polyurethane, polyethylene, teflon, wax, poly(meth)acrylate, etc.

The choice of the optimal binder is influenced by the chemical nature and water-solubility or water-dispersability of its main ingredients, i.e. the infra-red absorbing compound and the reducing agent.

The above mentioned polymers or mixtures thereof forming the binder may be used in conjunction with waxes or "heat solvents" also called "thermal solvents" or "thermosolvents" improving the reaction speed of the redox-reaction at elevated temperature.

In one embodiment of the present invention the reducible organic metal salt, said polymeric binder, said reducing agent and said infra-red absorbing compound are contained in one and the same layer of the thermographic material. In this embodiment the preferred concentration of the IR dye ranges from 0.01 g to 1.0 g per $m^2$, the preferred concentration of the organic metal salt ranges from 1.0 g to 10 g per $m^2$, and the preferred concentration of the reducing agent ranges from 0.5 g to 10 g per $m^2$.

In another embodiment of the present invention the thermographic material comprises, in order from the support, a first layer containing polymeric binder and said reducible organic metal salt, and a second layer containing polymeric binder and the reducing agent, whereas the infra-red absorbing compound is present in one of these two layers or distributed over both.

In still another embodiment of the invention the thermographic material comprises, in order from the support, a first layer containing polymeric binder and the reducible organic metal salt, a second layer, serving as barrier layer, containing polymeric binder, and a third layer containing said reducing agent, whereas the infrared absorbing compound is present either in the first layer, or in the second layer, or in the third layer, or distributed over any combination of these layers.

In these two last embodiments the reducible organic metal salt is separated from the reducing agent by coating of two layers optionally separated from each other by a barrier layer. This improves the long-term stability of the material. Moreover, it broadens the choice to more reactive reagent pairs.

In these different embodiments additional layers can he present such as adhesive layers, anti-halo layers, backing layers, a protective layer and an antistatic layer.

Apart from an improvement for scratch resistance the protective layer counteracts sublimation and/or ablation of the thermographic material during laser recording. Suitable protective layers can contain organic solvent-soluble, water-soluble and/or water-dispersable polymers, such as the ones mentioned as binders for the layer(s) described above. Also thermally curable polymeric systems, radiation curable polymeric systems, pressure sensitive laminate foils and laminate foils provided with a hot melt glue layer can be used. Lubricants can be applied in or on the surface of the protective layer. Suitable lubricants include silicone oils, polysiloxane surfactants, fluor containing polymers such as Teflon, fluor containing surfactants, polyethylene dispersions and waxes. The protective layer can further contain anorganic and organic particles such as crystalline and colloidal silica, titanium dioxide, polystyrene, polymethylmethacrylate, Teflon, silicones and glass beads.

The support of the thermographic material of the present invention may be opaque or transparent, e.g. a paper support or resin support. When a paper support is used preference is given to one coated at one or both sides with an Alpha-olefin polymer, e.g. a polyethylene layer which optionally contains an anti-halation dye or pigment. It is also possible to use an organic resin support e.g. cellulose nitrate film, cellulose acetate film, poly(vinyl acetal) film, polystyrene film, poly(ethylene terephthalate) film, polycarbonate film, polyvinylchloride film or poly-Alpha-olefin films such as polyethylene or polypropylene film. The thickness of such organic resin film is preferably comprised between 0.07 and 0.35 mm. These organic resin supports are preferably coated with a subbing layer which can contain water insoluble particles such as silica or titanium dioxide.

Self-evidently the option of a paper support is only valid in case of a final image meant for direct visual inspection, not in case of an intermediate for the exposure of a printing plate. In case of a transparent support the laser exposure can be performed through both sides of the support but preferably through the side with the reactive coating.

To form the heat mode image the thermal imaging medium described is exposed information-wise by an intense laser beam. Especially preferred lasers are semiconductor diode lasers or solid state lasers such as a Nd-YAG laser emitting at 1064 nm, or a Nd-YLF laser emitting at 1053 nm. Other possible infra-red laser types include diode lasers emitting at 823 nm or diode lasers emitting at 985 nm. A series of lasers can be used arranged in a particular array.

The obtained heat-mode image can be used as intermediate for the UW-exposure of a UW sensitive element, e.g. a printing plate, in those cases where infra-red absorbing compounds with low side absorptions in the near UV are used, or it can be used for direct visual inspection in those cases where infra-red absorbing compounds with low side absorptions in the visual region are used.

The present invention will be illustrated by the following examples without however being limited thereto.

EXAMPLES

Example 1

A series of test samples was prepared by applying several coating compositions onto a subbed polyethylene terephthalate support by means of doctor blade coating. These coating compositions were prepared as follows. Silver behenate was dispersed together with a solution of polyvinylbutyral in methylethylketone in a ball mill. To this dispersion the other ingredients were added so that after coating and drying these layers contained the following substances (see also table 8)
   silver behenate,
   polyvinylbutyral (BUTVAR B97, Monsanto),
   an infra-red absorbing compound according to table 8 (invention and control samples),
   reducing agent 3,3,3',3'-tetramethyl-5,6,5',6'-tetrahydroxy- spiro-bis-indane ("Spirana"),
   tone modifier 3,4-dihydro-2,4-dioxo-1,3,2H-benzoxazine,
   silicone oil.
The reducing agent and the tone modifier were added each in an amount equal to 20 mole % vis-a-vis silver behenate.

The silicone oil was of the dimethylsiloxane type and applied at a coverage of 0.03 g/m$^2$. The amount of polyvinylbutyral was established in such a way that a constant ratio of 0.3 of weight of polymer to weight of silver behenate was obtained (indicated as "posi" in the table). On top of these layers a protective layer was coated containing nitrocellulose at 0.45 g/m$^2$ and polysiloxane surfactant "DOW CORNING 190", marketed by Dow Corning, at 0.008 g/m$^2$.

By means of a Perkin-Elmer Lambda-9 spectrophotometer the optical infra-red density at 1053 nm was measured. The optical densities in the ultra-violet of the samples were measured with a McBeth densitometer type TD904 through a UV-filter.

Laser recording was performed through the side of the coatings by means of a Nd-YLF laser of 4 W power in an external drum arrangement. The spot diameter (D) measured at the 1/e$^2$ value of the intensity, the applied laser power on the film (P) and the circumpheral velocity of the drum (v) are also indicated in table 8. Full areas were inscribed by the laser arrangement and the optical density ($OD^{UV}_{laser}$) was measured. Also single scan lines were inscribed. As measure for the maximal obtainable optical density ($OD^{UV}_{max}$) the density obtained after a heat treatment of 10 seconds at 118° C. This density is self-evidently related to the silver behenate concentration in the layer.

The results summarized in table 8 can be interpreted as follows.

With the samples 1 to 13 according to the invention excellent images were obtained showing a good contrast in the UV and the visible spectral region and a good line quality. With the obtained images contact exposures were performed on the one hand onto a UV sensitive printing plate and on the other hand onto a UV sensitive photographic roomlight contact film. In both cases a faithful image rendering was obtained.

The minimal optical density of the invention samples was low and increases only slightly with increasing concentration of infra-red dye in the layer. This $OD^{UV}_{min}$ was low enough so that it did not interfere on contact exposures. In the visible region too there was no disturbing background density. The efficiency of the image formation was relatively good since the $OD^{UV}_{laser}$ values fairly approximated the $OD^{UV}_{max}$. This efficiency increased with increasing concentration of infra-red absorbing dye (related to $OD_{1053}$), allowing a lower laser power in order to obtain the same density. When incorporating IR-absorber No. 15 (control samples b, c, d) an unacceptable high minimum UV density was obtained which was prohibitive for the UV contact exposures of printing plates and roomlight materials. These samples also showed a disturbing green colour in the visible region.

Example 2

Similarly to example 1 samples were coated the data of which are summarized in table 9. The concentration of silver behenate and the total dry thickness were varied. Contrary to example 1 no protective layer was present.

The following conclusions can be deduced from the results of table 9. Higher concentrations on silver behenate gave rise to higher values of $OD^{UV}_{max}$. For thinner layers with lower amounts of silver behenate a lower laser power was required to obtain the maximal density. For thin layers with a higher concentration on IR absorbing dye (higher $OD_{laser}$) a lower laser power is required to obtain the maximal density.

Example 3

Similarly to example 1 materials were coated the composition and optical data of which are represented in table 10. The chemical nature of the organic silver salt was varied (AgBeh=silver behenate, AgStea=silver stearate, AgPalm=silver palmitate, AgLaur=silver laurate). The dispersion preparation, and the coating of the layers were similar to the data described for the examples with silver behenate.

From these data one can conclude that similar good results were obtained with each type of organic silver salt.

Example 4

Sample No. 16 from table 9 was coated again and aliquot samples of this coating were provided with a series of protective layers of different composition. Each type of protective layer was coated at respectively 0.2, 0.4, 0.8, 2.5 and 5.0 g/m².

Protective layers containing following polymers were coated from a 10% by weight solution from methylethylketone:nitrocellulose, a polycarbonate based on phosgene and 1,1-bis-(4hydroxyphenyl)-3,3,5-trimethylcyclohexane, cellulose-acetatebutyrate, copoly(styrene-acrylonitrile), a polyester based on terephthalic acid, trimellic acid, bis-(4-hydroxyethyl)-bisphenol A and bis-(4-hydroxypropyl)bisphenol A. From an aqueous medium was coated a 10% by weight polyurethane. A gelatin layer containing formaldehyde was coated from an aqueous solution and allowed to harden for 3 days. A UV-lacquer layer was coated from a methylethylketone solution containing 10% by weight of EBECRYL 1290 (UCB S.A., Drogenbos, Belgium) and 0.46% by weight of DAROCUR 1173 (Merck AG, Germany). After drying this layer was hardened by uniform UV exposure. All the coating solutions of the protective layers enumerated contained a polydimethylsiloxane-polyether surfactant.

Alternatively a sample of the laser sensitive layer was covered with a protective laminate foil TESA 4122 (Beiersdorf AG, Germany) provided with a glue layer and having a total thickness of 100 micron. Another sample was covered with a foil having a total thickness of 20 micron.

Protective layers having a coverage of 0.2 g/m² provided insufficient physical protection on laser recording. From 0.4 g/m² a good protection was obtained with all the tested protective layers and a good image was obtained. When performing contact exposures on a printing plate or a roomlight duplicating material good image rendering was obtained with the coated protective layers and with the foil of 20 micron. On the contrary image distortion occurred with the protective foil of 100 micron.

TABLE 1

| IRD No | Chemical Struature | Code Name | Source |
|---|---|---|---|
| 1 | see description | — | Bayer AG |
| 2 | " | — | " |
| 3 | " | — | " |
| 4 | " | — | " |
| 5 | " | — | " |
| 6 | " | — | " |
| 7 | " | — | " |
| 8 | " | — | " |
| 9 | " | — | " |
| 10 | " | — | " |
| 11 | " | — | " |
| 12 | " | — | " |
| 13 | " | — | " |
| 14 | " | Cyasorb 1R165 | Am. Cyanamid Co |
| 15 | " | — | Agfa |
| 16 | " | — | " |
| 17 | — | S 109186 | ICI |
| 18 | — | S 109564 | " |
| 19 | — | S 109 564/2 | " |
| 20 | — | SIR 130 | Mitsui Toatsu Dyes |
| 21 | — | SIR BLACK 950M | " |
| 22 | — | SIR BLACK 1050M | " |
| 23 | — | IRG-002 | Nippon Kayaku Co |
| 24 | — | IRG-022 | " |

TABLE 2

Average internal absorptances in wavelength intervals and internal absorptances at laser wavelengths.

| IRD No | Solvent | 330–430 | 400–499 | 500–599 | 600–700 | 400–700 | 823 | 985 | 1053 | 1064 |
|---|---|---|---|---|---|---|---|---|---|---|
| 1 | MEK | 0.185 | 0.170 | 0.221 | 0.170 | 0.187 | 0.259 | 0.617 | 0.809 | 0.758 |
| 2 | NEK | 0.182 | 0.128 | 0.134 | 0.134 | 0.132 | 0.582 | 0.653 | 0.965 | 0.935 |
| 3 | MEK | 0.259 | 0.167 | 0.150 | 0.196 | 0.172 | 0.526 | 0.994 | 0.911 | 0.759 |
| 4 | NEK | 0.242 | 0.180 | 0.173 | 0.190 | 0.181 | 0.392 | 0.849 | 0.885 | 0.756 |
| 5 | NEK | 0.283 | 0.205 | 0.246 | 0.298 | 0.250 | 0.660 | 0.803 | 0.989 | 0.991 |
| 6 | KEK | 0.503 | 0.334 | 0.401 | 0.321 | 0.352 | 0.670 | 0.937 | 0.968 | 0.976 |
| 7 | MEK | 0.366 | 0.346 | 0.318 | 0.183 | 0.282 | 0.295 | 0.813 | 0.968 | 0.955 |
| 8 | aceton | 0.325 | 0.275 | 0.299 | 0.270 | 0.2B2 | 0.517 | 0.913 | 0.696 | 0.583 |
| 9 | MEK | 0.216 | 0.161 | 0.197 | 0.152 | 0.170 | 0.211 | 0.845 | 0.965 | 0.981 |
| 10 | NEK | 0.458 | 0.309 | 0.239 | 0.250 | 0.266 | 0.738 | 1.000 | 0.999 | 0.983 |
| 11 | MEK | 0.424 | 0.295 | 0.231 | 0.227 | 0.251 | 0.690 | 1.000 | 0.995 | 0.958 |
| 12 | MEK | 0.404 | 0.298 | 0.232 | 0.239 | 0.256 | 0.634 | 0.994 | 0.994 | 0.962 |
| 13 | MEK | 0.312 | 0.229 | 0.193 | 0.198 | 0.207 | 0.472 | 0.947 | 0.938 | 0.842 |
| 14 | MEK | 0.291 | 0.277 | 0.021 | 0.058 | 0.118 | 0.252 | 0.344 | 0.262 | 0.255 |
| 15 | MEK | 0.157 | 0.167 | 0.269 | 0.199 | 0.212 | 0.627 | 0.021 | 0.025 | 0.027 |
| 16 | MeOH | 0.240 | 0.206 | 0.175 | 0.408 | 0.263 | 1.000 | 0.009 | 0.011 | 0.016 |
| 17 | MeOH | 0.503 | 0.283 | 0.196 | 0.215 | 0.231 | 0.475 | 0.247 | 0.092 | 0.077 |
| 18 | MeOH | 0.500 | 0.268 | 0.206 | 0.251 | 0.242 | 0.447 | 0.243 | 0.131 | 0.121 |
| 19 | MeOH | 0.538 | 0.295 | 0.226 | 0.279 | 0.267 | 0.473 | 0.262 | 0.151 | 0.139 |
| 20 | MEK | 0.763 | 0.399 | 0.195 | 0.187 | 0.260 | 0.582 | 0.838 | 0.356 | 0.282 |
| 21 | MEK | 0.387 | 0.269 | 0.235 | 0.260 | 0.255 | 0.273 | 0.134 | 0.032 | 0.024 |
| 22 | MEK | 0.388 | 0.251 | 0.200 | 0.237 | 0.229 | 0.258 | 0.143 | 0.150 | 0.152 |

TABLE 2-continued

Average internal absorptances in wavelength intervals and internal absorptances at laser wavelengths.

| IRD No | Solvent | 330–430 | 400–499 | 500–599 | 600–700 | 400–700 | 823 | 985 | 1053 | 1064 |
|---|---|---|---|---|---|---|---|---|---|---|
| 23 | MEK | 0.515 | 0.487 | 0.040 | 0.118 | 0.215 | 0.466 | 0.616 | 0.506 | 0.498 |
| 24 | MEK | 0.567 | 0.232 | 0.124 | 0.161 | 0.172 | 0.643 | 0.996 | 0.997 | 0.997 |

TABLE 3

Ratio's of internal absorptances

| Dye No. | $\dfrac{\bar{\alpha}_i\,(330\text{–}430)}{\alpha_i\,(1053)}$ | $\dfrac{\bar{\alpha}_i\,(330\text{–}430)}{\alpha_i\,(1064)}$ | $\dfrac{\bar{\alpha}_i\,(330\text{–}430)}{\alpha_i\,(985)}$ | $\dfrac{\bar{\alpha}_i\,(330\text{–}430)}{\alpha_i\,(823)}$ |
|---|---|---|---|---|
| 1 | 0.229 | 0.244 | 0.300 | 0.715 |
| 2 | 0.189 | 0.195 | 0.279 | 0.313 |
| 3 | 0.284 | 0.341 | 0.261 | 0.492 |
| 4 | 0.274 | 0.320 | 0.286 | 0.618 |
| 5 | 0.286 | 0.285 | 0.352 | 0.429 |
| 6 | 0.519 | 0.515 | 0.536 | 0.750 |
| 7 | 0.378 | 0.383 | 0.451 | 1.240 |
| 8 | 0.469 | 0.557 | 0.356 | 0.629 |
| 9 | 0.224 | 0.220 | 0.255 | 1.022 |
| 10 | 0.459 | 0.466 | 0.458 | 0.621 |
| 11 | 0.426 | 0.443 | 0.425 | 0.615 |
| 12 | 0.406 | 0.420 | 0.406 | 0.636 |
| 13 | 0.333 | 0.371 | 0.330 | 0.662 |
| 14 | 1.111 | 1.140 | 0.847 | 1.156 |
| 15 | 6.286 | 5.769 | 7.666 | 0.251 |
| 16 | 21.009 | 15.041 | 26.231 | 0.240 |
| 17 | 5.454 | 6.493 | 2.038 | 1.058 |
| 18 | 3.813 | 4.130 | 2.055 | 1.119 |
| 19 | 3.570 | 3.874 | 2.055 | 1.139 |
| 20 | 2.146 | 2.705 | 0.911 | 1.311 |
| 21 | 12.238 | 16.248 | 2.897 | 1.415 |
| 22 | 2.586 | 2.552 | 2.721 | 1.505 |
| 23 | 1.017 | 1.035 | 0.836 | 1.105 |
| 24 | 0.369 | 0.569 | 0.570 | 0.883 |

TABLE 4

Ratio's of internal absorptances at wavelength intervals and internal absorptance at 1053 nm.

| Dye No. | 400–499 | 500–599 | 600–700 | 400–700 |
|---|---|---|---|---|
| 1 | 0.210 | 0.273 | 0.210 | 0.231 |
| 2 | 0.132 | 0.139 | 0.139 | 0.137 |
| 3 | 0.184 | 0.165 | 0.216 | 0.188 |
| 4 | 0.204 | 0.196 | 0.215 | 0.205 |
| 5 | 0.207 | 0.248 | 0.301 | 0.252 |
| 6 | 0.345 | 0.414 | 0.332 | 0.364 |
| 7 | 0.358 | 0.328 | 0.190 | 0.291 |
| 8 | 0.395 | 3.429 | 0.388 | 0.405 |
| 9 | 0.167 | 0.205 | 0.157 | 0.176 |
| 10 | 0.309 | 0.239 | 0.250 | 0.266 |
| 11 | 0.296 | 0.232 | 0.228 | 0.252 |
| 12 | 0.300 | 0.234 | 0.241 | 0.258 |
| 13 | 0.244 | 0.206 | 0.211 | 0.220 |
| 14 | 1.056 | 0.081 | 0.222 | 0.452 |
| 15 | 6.642 | 10.759 | 7.968 | 8.471 |
| 16 | 17.987 | 15.267 | 35.616 | 22.999 |
| 17 | 3.070 | 2.126 | 2.328 | 2.507 |
| 18 | 2.045 | 1.570 | 1.914 | 1.843 |
| 19 | 1.958 | 1.500 | 1.852 | 1.770 |
| 20 | 1.121 | 0.548 | 0.524 | 0.730 |
| 21 | 8.515 | 7.432 | 8.240 | 8.063 |
| 22 | 1.670 | 1.334 | 1.578 | 1.528 |
| 23 | 0.963 | 0.079 | 0.233 | 0.424 |

TABLE 4-continued

Ratio's of internal absorptances at wavelength intervals and internal absorptance at 1053 nm.

| Dye No. | 400–499 | 500–599 | 600–700 | 400–700 |
|---|---|---|---|---|
| 24 | 0.233 | 0.125 | 0.162 | 0.173 |

TABLE 5

Ratio's of internal absorptances at wavelength intervals and internal absorptance at 1064 nm.

| Dye No. | 400–499 | 500–599 | 600–700 | 400–700 |
|---|---|---|---|---|
| 1 | 0.224 | 0.291 | 0.224 | 0.246 |
| 2 | 0.137 | 0.143 | 0.143 | 0.141 |
| 3 | 0.221 | 0.198 | 0.259 | 0.226 |
| 4 | 0.238 | 0.229 | 0.251 | 0.239 |
| 5 | 0.207 | 0.248 | 0.300 | 0.252 |
| 6 | 0.343 | 0.411 | 0.329 | 0.361 |
| 7 | 0.363 | 0.333 | 0.192 | 0.295 |
| 8 | 0.471 | 0.513 | 0.463 | 0.483 |
| 9 | 0.165 | 0.201 | 0.154 | 0.173 |
| 10 | 0.315 | 0.243 | 0.254 | 0.271 |
| 11 | 0.308 | 0.241 | 0.237 | 0.262 |
| 12 | 0.310 | 0.242 | 0.249 | 0.267 |
| 13 | 0.272 | 0.230 | 0.235 | 0.246 |
| 14 | 1.084 | 0.083 | 0.228 | 0.464 |
| 15 | 6.142 | 9.874 | 7.312 | 7.774 |
| 16 | 12.877 | 10.930 | 25.499 | 16.466 |
| 17 | 3.655 | 2.531 | 2.771 | 2.985 |
| 18 | 2.215 | 1.700 | 2.074 | 1.997 |
| 19 | 2.124 | 1.627 | 2.009 | 1.920 |
| 20 | 1.413 | 0.691 | 0.661 | 0.921 |
| 21 | 11.305 | 9.868 | 10.940 | 10.705 |
| 22 | 1.648 | 1.317 | 1.559 | 1.508 |
| 23 | 0.979 | 0.080 | 0.237 | 0.432 |
| 24 | 0.232 | 0.125 | 0.162 | 0.173 |

TABLE 6

Ratio's of internal absorptances at wavelength intervals and internal absorptance at 985 nm.

| Dye No. | 400–499 | 500–599 | 600–700 | 400–700 |
|---|---|---|---|---|
| 1 | 0.275 | 0.358 | 0.275 | 0.303 |
| 2 | 0.196 | 0.205 | 0.205 | 0.202 |
| 3 | 0.168 | 0.151 | 0.198 | 0.173 |
| 4 | 0.212 | 0.204 | 0.224 | 0.214 |
| 5 | 0.255 | 0.306 | 0.371 | 0.311 |
| 6 | 0.357 | 0.428 | 0.342 | 0.376 |
| 7 | 0.426 | 0.391 | 0.226 | 0.347 |
| 8 | 0.3C1 | 0.327 | 0.295 | 0.309 |
| 9 | 0.191 | 0.234 | 0.179 | 0.201 |
| 10 | 0.309 | 0.239 | 0.250 | 0.266 |
| 11 | 0.295 | 0.231 | 0.227 | 0.251 |
| 12 | 0.300 | 0.234 | 0.241 | 0.258 |
| 13 | 0.241 | 0.204 | 0.209 | 0.218 |
| 14 | 0.805 | 0.662 | 0.169 | 0.344 |
| 15 | 8.161 | 13.120 | 9.716 | 10.330 |
| 16 | 22.458 | 19.062 | 44.469 | 28.716 |

TABLE 6-continued

Ratio's of internal absorptances at wavelength intervals and internal absorptance at 985 nm.

| Dye No. | 400–499 | 500–599 | 600–700 | 400–700 |
|---|---|---|---|---|
| 17 | 1.147 | 0.795 | 0.870 | 0.937 |
| 18 | 1.102 | 0.846 | 1.032 | 0.993 |
| 19 | 1.126 | 0.863 | 1.065 | 1.018 |
| 20 | 0.476 | 0.233 | 0.223 | 0.310 |
| 21 | 2.015 | 1.759 | 1.950 | 1.908 |
| 22 | 1.757 | 1.403 | 1.660 | 1.607 |
| 23 | 0.792 | 0.065 | 0.192 | 0.349 |
| 24 | 0.233 | 0.125 | 0.162 | 0.173 |

TABLE 7

Ratio's of internal absorptances at wavelength intervals and internal absorptance at 823 nm.

| Dye No. | 400–499 | 500–599 | 600–700 | 400–700 |
|---|---|---|---|---|
| 1 | 0.657 | 0.854 | 0.656 | 0.722 |
| 2 | 0.220 | 0.230 | 0.230 | 0.227 |
| 3 | 0.318 | 0.286 | 0.374 | 0.326 |
| 4 | 0.460 | 0.442 | 0.485 | 0.463 |
| 5 | 0.311 | 0.372 | 0.451 | 0.378 |
| 6 | 0.499 | 0.598 | 0.479 | 0.525 |
| 7 | 1.173 | 1.076 | 0.621 | 0.956 |
| 8 | 0.532 | 0.578 | 0.522 | 0.545 |
| 9 | 0.765 | 0.935 | 0.718 | 0.805 |
| 10 | 0.419 | 0.323 | 0.339 | 0.360 |
| 11 | 0.428 | 0.334 | 0.328 | 0.363 |
| 12 | 0.470 | 0.366 | 0.377 | 0.404 |
| 13 | 0.485 | 0.410 | 0.420 | 0.438 |
| 14 | 1.099 | 0.084 | 0.231 | 0.470 |
| 15 | 0.267 | 0.429 | 0.318 | 0.338 |
| 16 | 0.206 | 0.175 | 0.408 | 0.263 |
| 17 | 0.596 | 0.412 | 0.452 | 0.486 |
| 18 | 0.600 | 0.461 | 0.562 | 0.541 |
| 19 | 0.624 | 0.478 | 0.591 | 0.565 |
| 20 | 0.685 | 0.335 | 0.321 | 0.446 |
| 21 | 0.985 | 0.860 | 0.953 | 0.933 |
| 22 | 0.972 | 0.776 | 0.918 | 0.889 |
| 23 | 1.046 | 0.085 | 0.254 | 0.461 |
| 24 | 0.361 | 0.193 | 0.251 | 0.268 |

TABLE 8

| Sample no. | IR-dye no. | Conc. IR (g/m²) | $OD_{1053\ nm}$ | Conc. AgBeh (g/m²) | PoSi | $OD^{UV}$ min | $OD^{UV}$ max | $OD^{UV}$ laser | D (μm) | P (W) | v (m/s) |
|---|---|---|---|---|---|---|---|---|---|---|---|
| 1 | 1 | 0.069 | 0.63 | 4.27 | 0.3 | 0.17 | >5 | 3.14 | 29.2 | 1.53 | 4.4 |
| 2 | 2 | 0.040 | 0.37 | 4.80 | 0.3 | 0.29 | 4.07 | 3.03 | 29.2 | 1.53 | 4.4 |
| 3 | 5 | 0.019 | 0.36 | 4.69 | 0.3 | 0.18 | 4.56 | 3.18 | 29.2 | 1.53 | 4.4 |
| 4 | 5 | 0.030 | 0.54 | 4.67 | 0.3 | 0.26 | 4.40 | 3.17 | 29.2 | 1.19 | 4.4 |
| 5 | 11 | 0.020 | 0.45 | 4.27 | 0.3 | 0.14 | 4.23 | 2.98 | 29.2 | 1.53 | 4.4 |
| 6 | 11 | 0.046 | 0.81 | 4.67 | 0.3 | 0.20 | 4.06 | 3.11 | 29.2 | 1.05 | 4.4 |
| 7 | 12 | 0.028 | 0.75 | 4.19 | 0.3 | 0.18 | 4.27 | 3.15 | 29.2 | 1.33 | 4.4 |
| 8 | 12 | 0.059 | 1.31 | 4.48 | 0.3 | 0.31 | 4.49 | 3.14 | 29.2 | 1.05 | 4.4 |
| 9 | 13 | 0.028 | 0.64 | 4.27 | 0.3 | 0.17 | 4.20 | 3.19 | 29.2 | 1.53 | 4.4 |
| 10 | 13 | 0.060 | 1.21 | 4.62 | 0.3 | 0.23 | 4.19 | 3.14 | 29.2 | 1.19 | 4.4 |
| comp. ex. a | — | — | 0.10 | 3.39 | 0.3 | 0.10 | 3.16 | | | | |
| b | 14 | 0.54 | 0.92 | 1.59 | 0.3 | 0.83 | 1.70 | 1.68 | 17 | 0.54 | 11 |
| c | 14 | 0.75 | 1.36 | 4.08 | 0.3 | 0.95 | 4.11 | 3.23 | 17 | 0.77 | 8.8 |
| | | | | | | | | 4.07 | 6 | 0.22 | 6.4 |
| d | 14 | 1.02 | 1.58 | 3.00 | 0.3 | 1.38 | 3.08 | 2.71 | 17 | 0.59 | 11 |
| 11 | 14 | 0.028 | 0.53 | 4.35 | 0.3 | 0.21 | 4.30 | 3.04 | 29.2 | 1.44 | 4.4 |
| 12 | 14 | 0.062 | 0.79 | 4.62 | 0.3 | 0.24 | 4.19 | 3.06 | 29.2 | 1.19 | 4.4 |
| 13 | 14. | 0.090 | 1.52 | 4.54 | 0.3 | 0.32 | 4.87 | 3.02 | 29.2 | 0.90 | 4.4 |
| comp. ex. a | — | — | 0.10 | 3.39 | 0.3 | 0.10 | 3.16 | | | | |
| b | 15 | 0.54 | 0.92 | 1.59 | 0.3 | 0.83 | 1.70 | 1.68 | 17 | 0.51 | 11 |
| c | 15 | 0.75 | 1.36 | 1.06 | 0.3 | 0.95 | 4.11 | 3.23 | 17 | 0.77 | 8.8 |
| | | | | | | | | 4.07 | 6 | 0.22 | 6.4 |
| d | 15 | 1.02 | 1.58 | 3.00 | 0.3 | 1.38 | 3.08 | 2.74 | 17 | 0.59 | 11 |

TABLE 9

| Sample no. | IR-dye no. | Conc. IRD (g/m²) | $OD_{1053\ nm}$ | Conc. AgBeh (g/m²) | PoSi | Thic. layer g/m² | $OD^{UV}$ min | $OD^{UV}$ max | $OD^{UV}$ laser | D (μm) | P (W) | v (m/s) |
|---|---|---|---|---|---|---|---|---|---|---|---|---|
| 14 | 1 | 0.095 | 0.707 | 2.18 | 0.3 | 3.53 | 0.21 | 2.43 | 2.50 | 17 | 0.15 | 2.2 |
| 15 | 1 | 0.092 | 0.699 | 4.34 | 0.3 | 7 | 0.21 | 3.53 | 3.24 | 17 | 0.26 | 2.2 |
| 16 | 1 | 0.098 | 0.81 | 4.51 | 0.3 | 7.1 | 0.20 | 3.46 | 3.48 | 17 | 0.26 | 2.4 |
| 17 | 1 | 0.198 | 1.195 | 2.26 | 0.3 | 3.70 | 0.35 | 2.69 | 2.22 | 17 | 0.11 | 2.2 |
| 18 | 1 | 0.175 | 1.22 | 4.03 | 0.3 | 6.5 | 0.29 | 3.65 | 3.22 | 17 | 0.21 | 2.2 |

TABLE 10

| Sample No. | IR-dye No. | Conc. IR (g/m$^2$) | OD$_{1053\ nm}$ | Type AgOS | Conc. AgOS g/m$^2$ | PoSi | Thic. layer g/m$^2$ | OD$^{UV}$ min | OD$^{UV}$ max | Laser OD$^{UV}$ laser | D (µm) | P (W) | v (m/s) |
|---|---|---|---|---|---|---|---|---|---|---|---|---|---|
| 19 | 1 | 0.069 | 0.63 | AgBeh | 4.23 | 0.3 | 6.7 | 0.17 | >5 | 3.12 | 29.2 | 1.4 | 4.4 |
| 20 | 1 | 0.076 | 0.65 | AgStea | 4.07 | 0.3 | 6.6 | 0.21 | >5 | 3.09 | 29.2 | 1.4 | 4.4 |
| 21 | 1 | 0.093 | 0.56 | AgPalm | 4.11 | 0.3 | 6.9 | 0.17 | 4.60 | 3.05 | 29.2 | 1.4 | 4.4 |
| 22 | 1 | 0.061 | 0.60 | AgLaur | 2.56 | 0.3 | 4.4 | 0.18 | 4.20 | 3.03 | 29.2 | 1.1 | 1.1 |

We claim:

1. A method for forming a heat mode image comprising exposing information-wise by infra-red laser radiation a thermographic material comprising a support and one or more layers comprising one or more of the following components: (a) a reducible organic metal salt, (b) polymeric binder, (c) a reducing agent, said one or more layers further comprising an infrared absorbing compound corresponding to the formula:

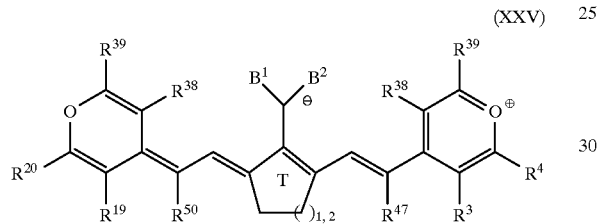

(XXV)

wherein $B^1$ represents cyano, alkoxycarbonyl, alkyl- or arylcarbonyl or aminocarbonyl optionally substituted once or twice at the nitrogen atom by a substituent, the substituent being independently selected in each instance from the group of substituents consisting of alkyl and[/or] aryl; $B^2$ represents arylsulphonyl, alkylsulphonyl, heteroaryl or $B^1$-C$^-$-B$^2$ can be represented by

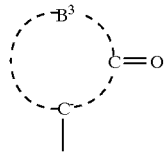

[y]

wherein $B^3$ represent the non-metal atoms to complete a carbocyclic or heterocyclic ring;

ring T can be substituted by 1 to 3 $C_1$–$C_4$ alkyl groups, n=1 or 2;

wherein $R^3$, $R^4$, $R^{19}$ and $R^{20}$ each independently represent hydrogen, $C_1$–$C_8$ alkyl, aryl, halogen, cyano, alkoxycarbonyl, optionally substituted aminocarbonyl, amino, monoalkylamino, dialkylamino, hydroxy, alkoxy, aryloxy, alkylthio, arylthio, acyloxy, acylamino, arylamino, alkylcarbonyl, arylcarbonyl or non-metal atoms to complete a cycloaliphatic, aromatic or heterocyclic 5- or 7-membered ring;

wherein $R^{38}$ and $R^{39}$ each independently represent hydrogen, alkyl, aryl or together the necessary non-metal atoms to complete a cycloaliphatic, aromatic or heterocyclic 5- or 7-membered ring, or independently from each other, the necessary non-metal atoms to complete a cycloaliphatic, aromatic or heterocyclic 5- or 7-membered ring;

wherein $R^{47}$ and $R^{50}$ represent hydrogen, alkyl, aryl, cyano, alkoxycarbonyl or the non-metal atoms necessary to form saturated or unsaturated 5- or 7-membered rings between $R^{47}$ and respectively $X_4$ and $R^3$, and $R^{50}$ and respectively $X^{11}$ and $R^{19}$.

2. A method for a forming a heat mode image comprising exposing information-wise by infra-red laser radiation a thermographic material comprising a support and one or more layers comprising one or more of the following components: (a) a reducible organic metal salt, (b) polymeric binder, (c) a reducing agent, said one or more layers further comprising an infra-red absorbing compound corresponding to the formula:

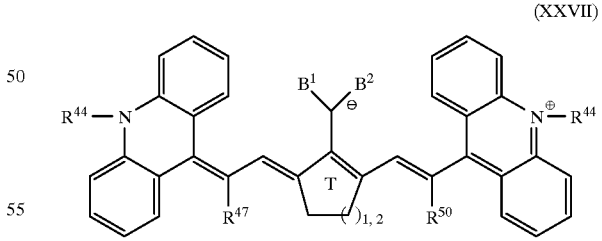

(XXVII)

wherein $B^1$ represents cyano, alkoxycarbonyl, alkyl- or arylcarbonyl or amino carbonyl optionally substituted once or twice at the nitrogen atom by a substituent, the substituent being independently selected in each instance from the group of substituents consisting of alkyl and[/or] aryl; $B^2$ represents arylsulphonyl, alkylsulphonyl, heteroaryl or

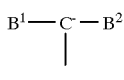

can be represented by

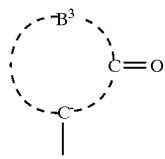

wherein $B^3$ represent the non-metal atoms to complete a carbocyclic or heterocyclic ring;

ring T can be substituted by 1 to 3 $C_1$–$C_4$ alkyl groups, n=1 or 2;

wherein $R^{44}$ represents optionally substituted alkyl or aryl or atoms to complete a 5- or 7-membered ring;

wherein $R^{47}$ and $R^{50}$ represent hydrogen, alkyl, aryl, cyano, alkoxycarbonyl or the non-metal atoms necessary to form saturated or unsaturated 5- to 7-membered rings between $R^{47}$ and respectively $X_4$ and $R^3$, and $R^{50}$ and respectively $X_{11}$ and $R^{19}$.

3. A method for forming a heat mode image comprising exposing information-wise by infra-red laser radiation a thermographic material comprising one or more layers comprising one or more of the following components: (a) a reducible organic metal salt, (b) polymeric binder, (c) a reducing agent, said one or more layers further comprising an infra-red absorbing compound corresponding to the formula: wherein $B^1$ represents cyano, alkoxycarbonyl, alkyl- or arylcarbonyl or

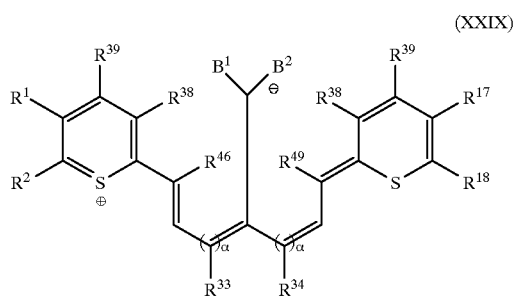

(XXIX)

aminocarbonyl optionally substituted once or twice at the nitrogen atom by a substituent, the substituent being independently selected in each instance from the group of substituents consisting of alkyl and[/or] aryl;

$B^2$ represents arylsulphonyl, alkylsulphonyl, heteroaryl or

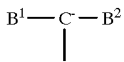

can be represented by

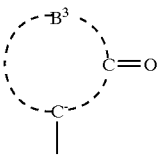

wherein $B^3$ represent the non-metal atoms to complete a carbocyclic or heterocyclic ring; ring T can be substituted by 1 to 3 $C_1$–$C_4$ alkyl groups, n=1 or 2;

wherein $R^1$, $R^2$, $R^{17}$, $R^{18}$ each independently represent hydrogen, C-C8 alkyl, aryl, halogen, cyano, alkoxycarbonyl, optionally substituted aminocarbonyl, amino, monoalkylamino, dialkylamino, hydroxy, alkoxy, aryloxy, alkylthio, arylthio, acyloxy, acylamino, arylamino, alkylcarbonyl, arylcarbonyl or non-metal atoms to complete a cycloaliphatic, aromatic or heterocyclic 5- or 7-membered ring;

wherein $R^{33}$ and $R^{34}$ represent, independently of each other, hydrogen, alkyl, aryl, alkoxycarbonyl or together represent the non-metal atoms necessary to close a substituted carbo- or heterocyclic 5- to 7-membered ring;

$R^{38}$ and $R^{39}$ each independently represent hydrogen, alkyl, aryl or together the necessary non-metal atoms to complete a cycloaliphatic, aromatic or heterocyclic 5- or 7-membered ring, or independently from each other, the necessary non-metal atoms to complete a cycloaliphatic, aromatic or heterocyclic 5- or 7-membered ring;

wherein $R^{46}$, $R^{49}$ represent hydrogen, alkyl, aryl, cyano, alkoxycarbonyl or the non-metal atoms necessary to form saturated or unsaturated 5- to 7-membered rings between $R^{47}$ and respectively $X^4$ and $R^3$, and $R^{50}$ and respectively $X^{11}$ and $R^{19}$, α is 0 or 1.

4. The method according to claims 1, 2 or 3 wherein

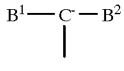

is represented by

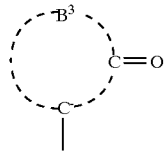

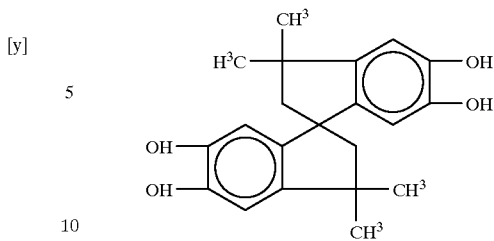

wherein $B^3$ represents the non-metal atoms to complete an optionally substituted barbituric acid or thio barbituric acid moiety.

5. The method according to claim 1, 2 or 3, wherein said reducible organic metal salt, said polymeric binder, said reducing agent and said infra-red absorbing compound are contained in at least one layer of said thermographic material.

6. The method according to claim 1, 2 or 3, wherein said thermographic material comprises, in order from the support, a first layer containing polymeric binder and said reducible organic metal salt, and a second layer containing polymeric binder and said reducing agent, whereas said infra-red absorbing compound is present either in said first layer, or in the second layer or distributed over said first and second layer.

7. The method according to claim 1, 2 or 3, wherein said thermographic material comprises, in order from the support, a first layer containing polymeric binder and said reducible organic metal salt, a second layer, serving as a barrier layer; said second layer containing polymeric binder, and a third layer containing said reducing agent, whereas the infra-red absorbing compound is present either in the first layer, or in the second layer, or in the third layer, or distributed over any combination of said layers.

8. The method according to claim 1, 2 or 3, wherein said reducible organic metal salt is a reducible organic silver salt.

9. The method according to claim 8, wherein said reducible organic silver salt is silver behenate.

10. The method according to claim 9, wherein the concentration of said organic silver salt is comprised between 0.5 and 10 g/m².

11. The method according to claim 1, 2 or 3, wherein said thermographic material further contains a toning agent in the one or more layer where the reducible organic metal salt is present.

12. The method according to claim 1, 2 or 3, wherein said reducible organic metal salt is a reducible organic iron(III) salt or a reducible organic cobalt(III) salt.

13. The method according to claim 1, 2 or 3, wherein said reducing agent is the following compound:

14. The method according to claim 1, 2 or 3, wherein said polymeric binder is polyvinylbutyral.

15. The method according to claim 1, 2 or 3, wherein said thermographic material further comprises a protective top layer.

16. The method according to claim 15, wherein said protective top layer contains a lubricant.

17. The method according to any of claims 1, 2 or 3, wherein said laser exposure is performed by a solid state laser, a diode laser, or an array of solid state or diode lasers.

18. The method according to claim 1, wherein in formulae (XXV) $R^4$, $R^{20}$, $R^{39}$ represent phenyl and $R^3$, $R^{19}$, $R^{38}$ represent hydrogen or $C_1$–$C_4$-alkyl.

19. The method according to claim 1, wherein in formulae (XXV)

$R^{47}=R^{50}$, $R^3=R^{38}=R^{19}$, and $R^4=R^{20}=R^{39}$.

20. The method according to claim 2, wherein in formulae (XXVII) $R^{47}$ and $R^{50}$ are identical and represent hydrogen or $C_1$–$C_{16}$-alkyl.

21. The method according to claim 3, wherein in formulae (XXIX)

$R^1=R^{17}$, $R^2=R^{18}$, and $R^{46}=R^{49}$.

22. The method according to claim 3, wherein in formulae (XXIX) $R^1$, $R^{17}$ represent hydrogen, $C_1$–$C_4$-alkyl, benzoyl or $C_1$–$C_4$-alkoxy carbonyl, $R^2$, $R^{18}$, $R^{39}$ represent phenyl, $R^{38}$ represents hydrogen, $C_1$–$C_4$-alkyl, or phenyl or $R^{38}$ and $R^{46}$, or $R^{49}$ and $R^{38}$, together represent a di- or trimethylene residue.

23. The method according to claim 3, wherein in formulae (XXIX) $R^{39}$, $R^2$, $R^{18}$ represent phenyl, $R^1$, $R^{17}$ represent hydrogen and $R^{38}$ and $R^{46}$, $R^{38}$ and $R^{39}$ together represent a di- or trimethylene residue.

24. The method according to claim 3, wherein in formulae (XXIX) α is identical to 1, and $R^{33}$ and $R^{34}$ together form a di- or trimethylene residue.

* * * * *

UNITED STATES PATENT AND TRADEMARK OFFICE
CERTIFICATE OF CORRECTION

PATENT NO. : 5,948,600
DATED : September 7, 1999
INVENTOR(S) : Roschger et al.

It is certified that error appears in the above-identified patent and that said Letters Patent is hereby corrected as shown below:

Table Column

Column 24, Table 2;
"1064", row "IRD No 4": "0.756" should read -- 0.758 --

Column 26, Table 6;
"400-499", row "Dye No. 8": "0.3C1" should read -- 0.301 --.

Column 28, Table 8;
"AbBeh $(g/m^2)$", row "comp. ex. c" (second occurrence): "1.06" should read -- 4.08 --
"$OD^{UV}$ laser", row "Sample No. 6": "3.11" should read -- 3.14 --; and row "comp. ex. d" (first occurrence): "2.71" should read -- 2.74 --
"P (W)", row "comp. ex. b" (second occurrence): "0.51" should read -- 0.54 --

Column 28, Table 9;
"V (m/s)", row "Sample No. 16":"2.4" should read -- 2.2 --

Column 29, Table 10;
"Conc. IR $(g/m^2)$", row "Sample No. 21": "0.093" should read -- 0.083 --
"Thic. Layer $g/m^2$", row "Sample No. 21": "6.9" should read -- 6.8 --
$OD^{UV}$ max.", row "Sample No. 22: "4.20" should read -- 4.28 --
"P (W)", row "Sample No. 22": "1.1" should read -- 1.4 --;
"V (m/s)", row "Sample No. 22": "1.1" should read -- 4.4 --;

UNITED STATES PATENT AND TRADEMARK OFFICE
CERTIFICATE OF CORRECTION

PATENT NO. : 5,948,600
DATED : September 7, 1999
INVENTOR(S) : Roschger et al.

It is certified that error appears in the above-identified patent and that said Letters Patent is hereby corrected as shown below:

Column 31,
Lines 47-48, "wherein B1 represents cyano, alkoxycarbonyl, alkyl– or arylcarbonyl or" should be deleted;
Line 63, "aminocarbonyl" should read -- wherein $B^1$ represents cyano, alkoxycarbonyl, alkyl– or arylcarbonyl or aminocarbonyl --.

Signed and Sealed this

Fourteenth Day of August, 2001

*Attest:*

*Attesting Officer*

NICHOLAS P. GODICI
*Acting Director of the United States Patent and Trademark Office*